(12) United States Patent
Usoro et al.

(10) Patent No.: US 6,746,357 B1
(45) Date of Patent: Jun. 8, 2004

(54) FAMILY OF SIX-SPEED DUAL-CLUTCH TRANSMISSIONS HAVING FOUR PLANETARY GEAR SETS AND THREE BRAKES

(75) Inventors: Patrick Benedict Usoro, Troy, MI (US); Chunhao J. Lee, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/323,356

(22) Filed: Dec. 18, 2002

(51) Int. Cl.$^7$ .................................................. F16H 3/62
(52) U.S. Cl. ...................................... 475/275; 475/303
(58) Field of Search ................................. 475/303, 275

(56) References Cited

U.S. PATENT DOCUMENTS

| | | | |
|---|---|---|---|
| 4,046,031 A | * | 9/1977 | Ott et al. ..................... 475/280 |
| 4,070,927 A | | 1/1978 | Polak .......................... 74/765 |
| 4,683,776 A | * | 8/1987 | Klemen ....................... 475/286 |
| 4,709,594 A | | 12/1987 | Maeda ......................... 74/753 |
| 5,106,352 A | | 4/1992 | Lepelletier .................. 475/280 |
| 5,385,064 A | | 1/1995 | Reece .......................... 74/331 |
| 5,497,867 A | | 3/1996 | Hirsch et al. ............. 192/48.91 |
| 5,560,461 A | | 10/1996 | Loeffler .................... 192/53.32 |
| 5,599,251 A | | 2/1997 | Beim et al. ................. 475/275 |
| 5,641,045 A | | 6/1997 | Ogawa et al. ......... 192/53.341 |
| 5,651,435 A | | 7/1997 | Perosky et al. .............. 192/24 |
| 5,879,263 A | * | 3/1999 | Haka .......................... 475/276 |
| 5,975,263 A | | 11/1999 | Forsyth .................... 192/53.32 |
| 6,053,839 A | | 4/2000 | Baldwin et al. ............. 475/281 |
| 6,071,208 A | | 6/2000 | Koivunen .................... 475/275 |
| 6,083,135 A | | 7/2000 | Baldwin et al. ............. 475/276 |
| 6,176,803 B1 | * | 1/2001 | Meyer et al. ............... 475/286 |
| 6,217,474 B1 | | 4/2001 | Ross et al. ................... 475/269 |
| 6,354,416 B1 | | 3/2002 | Eo ........................ 192/53.341 |
| 6,663,528 B1 | * | 12/2003 | Haka .......................... 475/303 |
| 6,663,529 B1 | * | 12/2003 | Haka .......................... 475/303 |
| 6,669,596 B1 | * | 12/2003 | Sefcik ........................ 475/278 |
| 2003/0232689 A1 | * | 12/2003 | Haka .......................... 475/303 |

FOREIGN PATENT DOCUMENTS

JP  9-126283  5/1997

* cited by examiner

*Primary Examiner*—Dirk Wright
(74) *Attorney, Agent, or Firm*—Kathryn A. Marra

(57) ABSTRACT

The family of transmissions has a plurality of members that can be utilized in powertrains to provide at least six forward speed ratios and one reverse speed ratio. The transmission family members include four planetary gear sets, two input clutches, eight torque transmitting mechanisms, and three fixed interconnections. The invention provides a low content multi-speed dual-clutch transmission mechanisms wherein the two input clutches alternately connect the engine to realize odd and even number speed ratio ranges. The eight torque transmitting mechanisms provide connections between various gear members, the fixed interconnections, the input clutches, the output shaft, and the transmission housing, and are operated in combinations of three to establish at least six forward speed ratios and at least one reverse speed ratio. One of the eight torque transmitting mechanisms may be eliminated to realize five forward speed ratios and at least one reverse speed ratio.

30 Claims, 7 Drawing Sheets

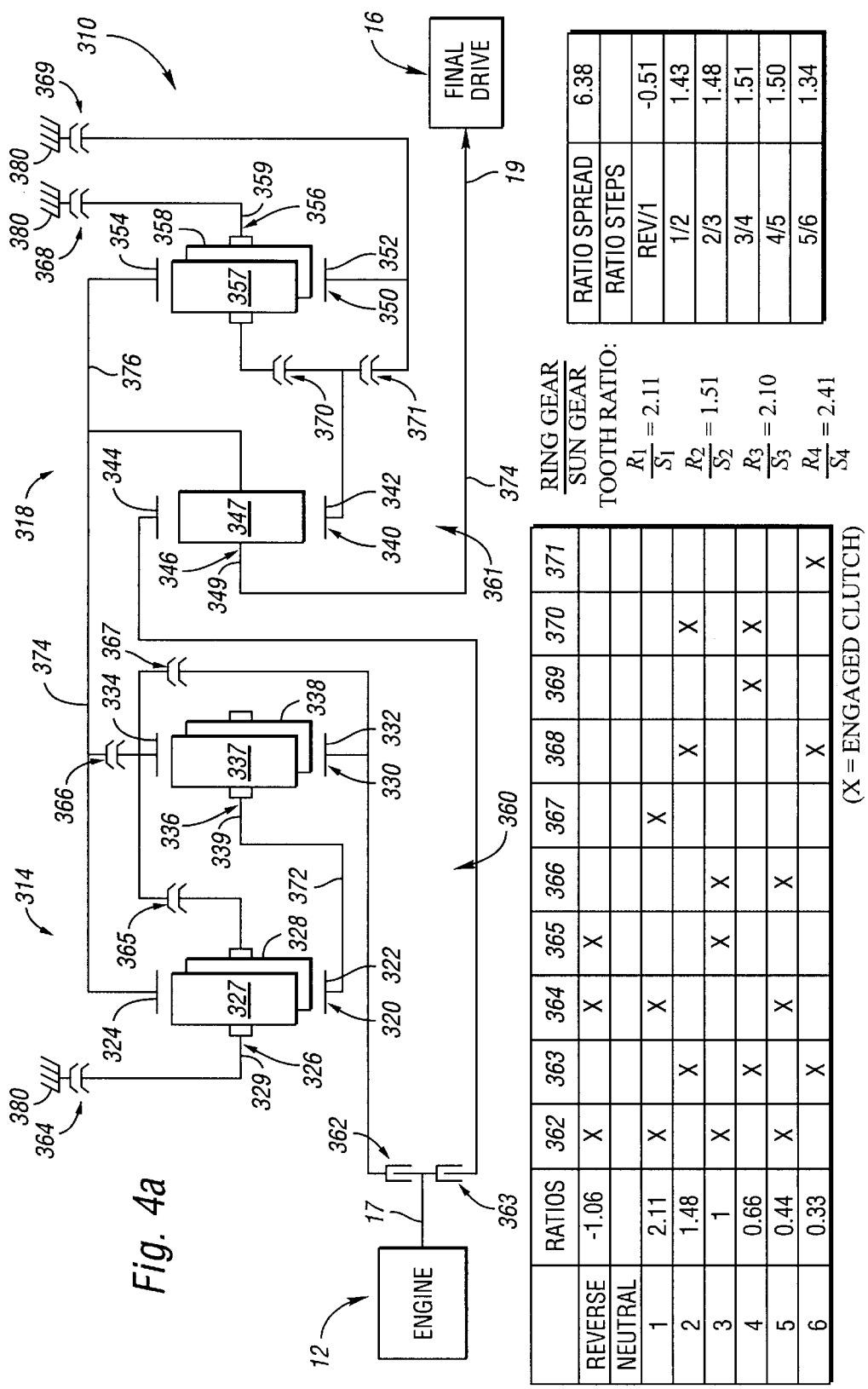

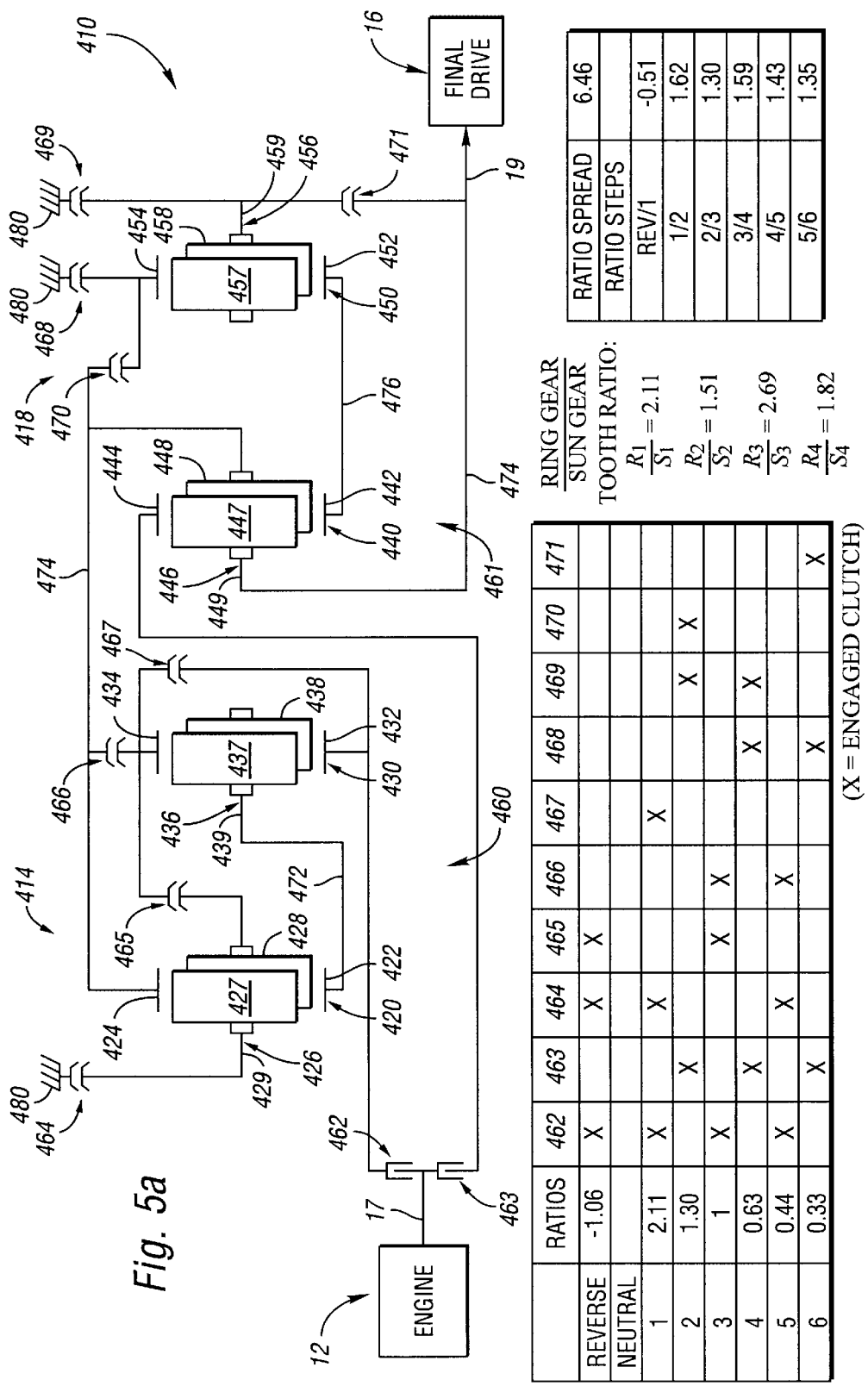

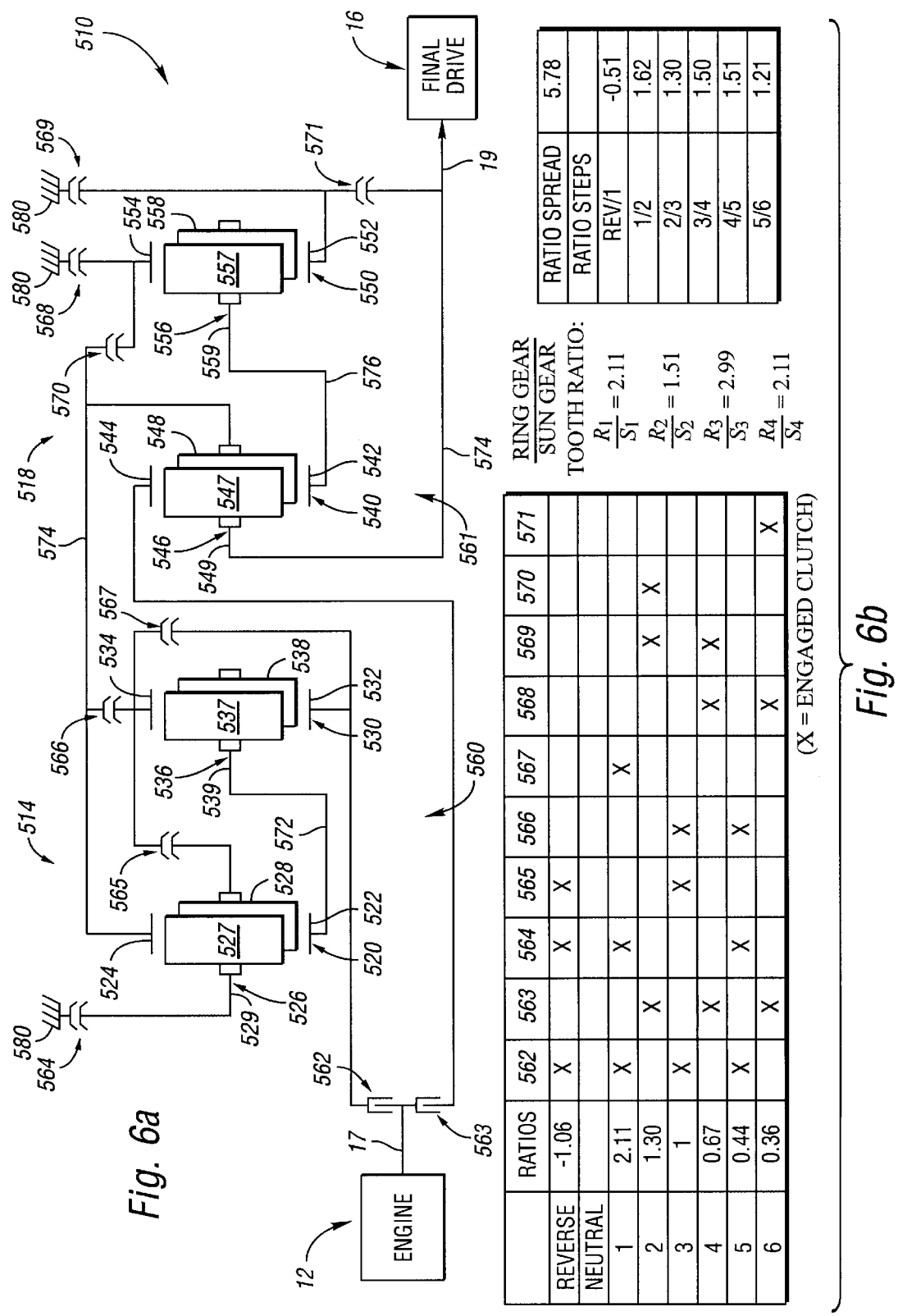

FAMILY OF SIX-SPEED DUAL-CLUTCH TRANSMISSIONS HAVING FOUR PLANETARY GEAR SETS AND THREE BRAKES

TECHNICAL FIELD

The present invention relates to a family of power transmissions having two input clutches which selectively connect an input shaft to first and second pairs of planetary gear sets to provide at least five forward speed ratios and one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times.

A primary focus of transmission and engine design work is in the area of increasing vehicle fuel efficiency. Manual transmissions typically provide improved vehicle fuel economy over automatic transmissions because automatic transmissions use a torque converter for vehicle launch and multiple plate hydraulically-applied clutches for gear engagement. Clutches of this type, left unengaged or idling, impose a parasitic drag torque on a drive line due to the viscous shearing action which exists between the plates and discs rotating at different speeds relative to one another. This drag torque adversely affects vehicle fuel economy for automatic transmissions. Also, the hydraulic pump that generates the pressure needed for operating the above-described clutches further reduces fuel efficiency associated with automatic transmissions. Manual transmissions eliminate these problems.

While manual transmissions are not subject to the above described fuel efficiency related problems, manual transmissions typically provide poor shift quality because a significant torque interruption is required during each gear shift as the engine is disengaged from the transmission by the clutch to allow shafts rotating at different speeds to be synchronized.

So called "automated manual" transmissions provide electronic shifting in a manual transmission configuration which, in certain circumstances, improves fuel efficiency by eliminating the parasitic losses associated with the torque converter and hydraulic pump needed for clutching. Like manual transmissions, a drawback of automated manual transmissions is that the shift quality is not as high as an automatic transmission because of the torque interruption during shifting.

So called "dual-clutch automatic" transmissions also eliminate the torque converter and replace hydraulic clutches with synchronizers but they go further to provide gear shift quality which is superior to the automated manual transmission and similar to the conventional automatic transmission, which makes them quite attractive. However, most known dual-clutch automatic transmissions include a lay shaft or countershaft gear arrangement, and have not been widely applied in vehicles because of their complexity, size and cost. For example, a dual clutch lay shaft transmission could require eight sets of gears, two input/shift clutches and seven synchronizers/dog clutches to provide six forward speed ratios and a reverse speed ratio. An example of a dual-clutch automatic transmission is described in U.S. Pat. No. 5,385,064, which is hereby incorporated by reference.

SUMMARY OF THE INVENTION

The invention provides a low content multi-speed dual-clutch transmission family utilizing planetary gear sets rather than lay shaft gear arrangements. In particular, the invention includes four planetary gear sets, two input/shift clutches, and eight selectable torque transmitting mechanisms to provide at least six forward speed ratios and a reverse speed ratio.

According to one aspect of the invention, the family of transmissions has four planetary gear sets, each of which includes a first, second and third member, which members may comprise a sun gear, ring gear, or a planet carrier assembly member.

In referring to the first, second, third and fourth gear sets in this description and in the claims, these sets may be counted "first" to "fourth" in any order in the drawings (i.e. left-to-right, right-to-left, etc.).

In another aspect of the present invention, each of the planetary gear sets may be of the single pinion type or of the double pinion type.

In yet another aspect of the present invention, the first member of the first planetary gear set is continuously connected with the first member of the second planetary gear set through a first interconnecting member.

In yet another aspect of the present invention, another member of the first or second planetary gear set is continuously connected with the first member of the third planetary gear set and with the output shaft through a second interconnecting member.

In yet another aspect of the present invention, a member of the third planetary gear set is continuously connected with a member of the fourth planetary gear set through a third interconnecting member.

In accordance with a further aspect of the invention, a first input clutch selectively connects the input shaft with a member of the first or second planetary gear set.

In accordance with another aspect of the present invention, a second input clutch selectively connects the input shaft with a member of the third planetary gear set.

In another aspect of the invention, first, second and third torque transmitting mechanisms, such as synchronizers, selectively connect members of the first and second planetary gear sets with other members of the first and second planetary gear sets, or with the first input clutch.

In still a further aspect of the invention, fourth and fifth torque transmitting mechanisms, such as synchronizers, selectively connect members of the third planetary gear set with members of the fourth planetary gear set.

In still another aspect of the invention, a sixth torque transmitting mechanism, such as a braking synchronizer, selectively connects a member of the first or second planetary gear set with a stationary member (transmission housing).

In still another aspect of the invention, seventh and eighth torque transmitting mechanisms, such as braking synchronizers, selectively connect members of the fourth planetary gear set with the stationary member.

In accordance with a further aspect of the invention, the input clutches and torque transmitting mechanisms are selectively engaged in combinations of at least three to provide at least six forward speed ratios and a reverse speed ratio.

In accordance with a further aspect of the invention, the first input clutch is applied for odd number speed ranges, and the second input clutch is applied for even number speed ranges, or vice versa.

In another aspect of the invention, the first input clutch and the second input clutch are interchanged (i.e. alternately engaged) to shift from odd number speed range to even number speed range, or vice versa.

In accordance with a further aspect of the invention, each selected torque transmitting mechanism for a new speed ratio is engaged prior to shifting of the input clutches to achieve shifts without torque interruptions.

In accordance with a further aspect of the invention, at least one pair of synchronizers is executed as a double synchronizer to reduce cost and package size.

In accordance with a further aspect of the invention, at least one of the torque transmitting mechanisms can be eliminated to realize five forward speed ratios and a reverse speed ratio.

The above objects, features, advantages, and other objects, features, and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission incorporating a family member of the present invention;

FIG. 1b is a truth table and chart depicting some of the operating characteristics of the powertrain shown in FIG. 1a;

FIG. 2a is a schematic representation of a powertrain having a planetary transmission incorporating another family member of the present invention;

FIG. 2b is a truth table and chart depicting some of the operating characteristics of the powertrain shown in FIG. 2a;

FIG. 3a is a schematic representation of a powertrain having a planetary transmission incorporating another family member of the present invention;

FIG. 3b is a truth table and chart depicting some of the operating characteristics of the powertrain shown in FIG. 3a;

FIG. 4a is a schematic representation of a powertrain having a planetary transmission incorporating another family member of the present invention;

FIG. 4b is a truth table and chart depicting some of the operating characteristics of the powertrain shown in FIG. 4a;

FIG. 5a is a schematic representation of a powertrain having a planetary transmission incorporating another family member of the present invention;

FIG. 5b is a truth table and chart depicting some of the operating characteristics of the powertrain shown in FIG. 5a;

FIG. 6a is a schematic representation of a powertrain having a planetary transmission incorporating another family member of the present invention;

FIG. 6b is a truth table and chart depicting some of the operating characteristics of the powertrain shown in FIG. 6a;

FIG. 7a is a schematic representation of a powertrain having a planetary transmission incorporating another family member of the present invention; and FIG. 7b is a truth table and chart depicting some of the operating characteristics of the powertrain shown in FIG. 7a.

DESCRIPTION OF THE PREFERRED EMBODIMENTS

Figures 1A, 1B:
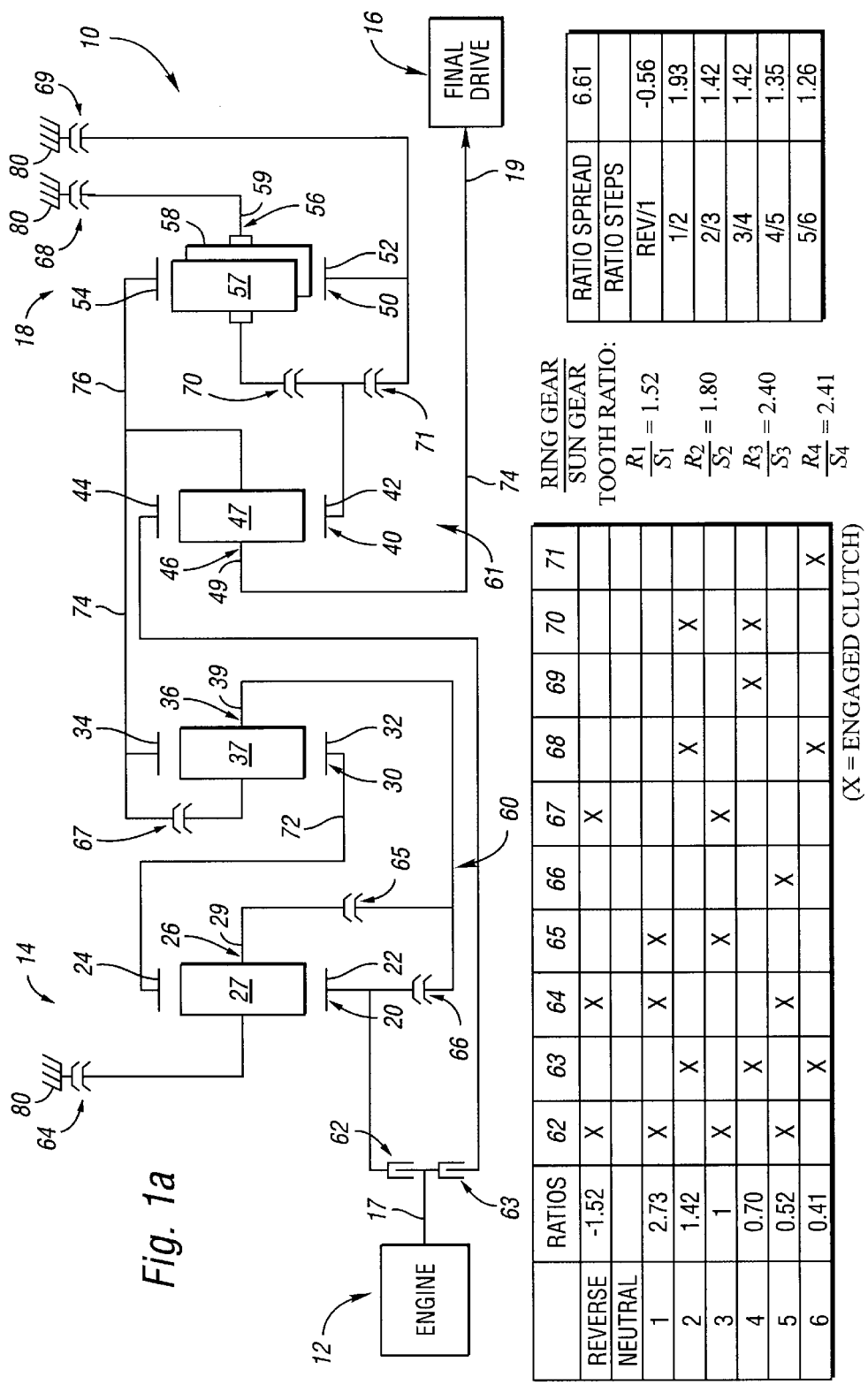

Referring to the drawings, wherein like characters represent the same or corresponding parts throughout the several views, there is shown in FIG. 1a a powertrain 10 having a conventional engine 12, a planetary transmission 14, and a conventional final drive mechanism 16.

The planetary transmission 14 includes an input shaft 17 continuously connected with the engine 12, a planetary gear arrangement 18, and an output shaft 19 continuously connected with the final drive mechanism 16. The planetary gear arrangement 18 includes four planetary gear sets 20, 30, 40 and 50.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of pinion gears 47 rotatably mounted on a carrier member 49 and disposed in meshing relationship with both the sun gear member 42 and the ring gear member 44.

The planetary gear set 50 includes a sun gear member 52, a ring gear member 54, and a planet carrier assembly member 56. The planet carrier assembly member 56 includes a plurality of intermeshing pinion gears 57, 58 rotatably mounted on a carrier member 59 and disposed in meshing relationship with the ring gear member 54 and the sun gear member 52, respectively.

As a result of the dual clutch arrangement of the invention, the four planetary gear sets 20, 30, 40 and 50 are divided into first and second transmission subsets 60, 61 which are alternatively engaged to provide odd number and even number speed ranges, respectively. Transmission subset 60 includes planetary gear sets 20 and 30, and transmission subset 61 includes planetary gear sets 40 and 50. The output shaft 19 is continuously connected with members of both subsets 60 and 61.

As mentioned above, the first and second input clutches 62, 63 are alternatively engaged for transmitting power from the input shaft 17 to transmission subset 60 or transmission subset 61. The first and second input clutches 62, 63 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 60, 61 prior to engaging the respective input clutches 62, 63. The preselection is achieved by means of electronically controlled synchronizers. As shown, the planetary gear arrangement includes eight torque transmitting mechanisms 64, 65, 66, 67, 68, 69, 70 and 71. The torque transmitting mechanisms 64, 68 and 69 comprise braking synchronizers, and the torque transmitting mechanisms 65, 66, 67, 70 and 71 comprise rotating synchronizers.

The braking synchronizers and rotating synchronizers are referenced in the claims as follows: first, second and third torque transmitting mechanisms 65, 66, 67; fourth and fifth torque transmitting mechanisms 70, 71; sixth torque transmitting mechanism 64; and seventh and eighth torque transmitting mechanisms 68, 69. Other family members are similarly referenced in the claims (i.e. rotating synchronizers generally in order of transmission subsets from left to right in the Figures, and braking synchronizers generally in order of transmission subsets from left to right in the Figures).

By way of example, synchronizers which may be implemented as the rotating and/or braking synchronizers referenced herein are shown in the following patents, each of which are incorporated by reference in their entirety: U.S. Pat. Nos. 5,651,435; 5,975,263; 5,560,461; 5,641,045; 5,497,867; 6,354,416.

Accordingly, the input shaft 17 is alternately connected with the first and second transmission subsets 60, 61 (i.e. through the clutch 62 to the sun gear member 22 and through the clutch 63 to the ring gear member 44). The ring gear member 24 is continuously connected with the sun gear member 32 through the interconnecting member 72. The ring gear member 34 is continuously connected with the planet carrier assembly member 46 and the output shaft 19 through the interconnecting member 74. The planet carrier assembly member 46 is continuously connected with the ring gear member 54 through the interconnecting member 76.

The sun gear member 22 is selectively connectable with the input shaft 17 through the input clutch 62. The ring gear member 44 is selectively connectable with the input shaft 17 through the input clutch 63. The planet carrier assembly member 26 is selectively connectable with the transmission housing 80 through the synchronizing brake 64. The planet carrier assembly member 26 is selectively connectable with the planet carrier assembly member 36 through the synchronizer 65. The sun gear member 22 is selectively connectable with the planet carrier assembly member 36 through the synchronizer 66. The ring gear member 34 is selectively connectable with the planet carrier assembly member 36 through the synchronizer 67. The planet carrier assembly member 56 is selectively connectable with the transmission housing 80 through the synchronizing brake 68. The sun gear member 52 is selectively connectable with the transmission housing 80 through the synchronizing brake 69. The sun gear member 42 is selectively connectable with the planet carrier assembly member 56 through the synchronizer 70. The sun gear member 42 is selectively connectable with the sun gear member 52 through the synchronizer 71.

As shown in FIG. 1*b*, and in particular the truth table disclosed therein, the input clutches and torque transmitting mechanisms are selectively engaged in combinations of three to provide six forward speed ratios and a reverse speed ratio.

The reverse speed ratio is established with the engagement of the input clutch 62, the synchronizing brake 64 and the synchronizer 67. The input clutch 62 connects the sun gear member 22 to the input shaft 17. The synchronizing brake 64 connects the planet carrier assembly member 26 to the transmission housing 80. The synchronizer 67 connects the ring gear member 34 to the planet carrier assembly member 36. The sun gear member 22 rotates at the same speed as the input shaft 17. The planet carrier assembly member 26 does not rotate. The ring gear member 24, the planetary gear set 30 and the planet carrier assembly member 46 rotates at the same speed as the output shaft 19. The sun gear member 24, and therefore the output shaft 19, rotates at a speed determined from the speed of the sun gear member 22 and the ring gear/sun gear tooth ratio of the planetary gear set 20. The numerical value of the reverse speed ratio is determined utilizing the ring gear/sun gear tooth ratio of the planetary gear set 20.

The first forward speed ratio is established with the engagement of the input clutch 62, the synchronizing brake 64 and the synchronizer 65. The input clutch 62 connects the sun gear member 22 to the input shaft 17. The synchronizing brake 64 connects the planet carrier assembly member 26 to the transmission housing 80. The synchronizer 65 connects the planet carrier assembly member 26 to the planet carrier assembly member 36. The sun gear member 22 rotates at the same speed as the input shaft 17. The planet carrier assembly member 26 and the planet carrier assembly member 36 do not rotate. The ring gear member 24 rotates at the same speed as the sun gear member 32. The ring gear member 24 rotates at a speed determined from the speed of the sun gear member 22 and the ring gear/sun gear tooth ratio of the planetary gear set 20. The ring gear member 34 and the planet carrier assembly member 46 rotate at the same speed as the output shaft 19. The ring gear member 34, and therefore the output shaft 19, rotates at a speed determined from the speed of the sun gear member 32 and the ring gear/sun gear tooth ratio of the planetary gear set 30. The numerical value of the first forward speed ratio is determined utilizing the ring gear/sun gear tooth ratios of the planetary gear sets 20, 30.

The second forward speed ratio is established with the engagement of the input clutch 63, the synchronizing brake 68 and the synchronizer 70. The input clutch 63 connects the ring gear member 44 to the input shaft 17. The synchronizing brake 68 connects the planet carrier assembly member 56 to the transmission housing 80. The synchronizer 70 connects the sun gear member 42 to the planet carrier assembly member 56. The sun gear member 42 and the planet carrier assembly member 56 do not rotate. The planet carrier assembly member 46 and the ring gear member 54 rotate at the same speed as the output shaft 19. The ring gear member 44 rotates at the same speed as the input shaft 17. The planet carrier assembly member 46, and therefore the output shaft 19, rotates at a speed determined from the speed of the ring gear member 44 and the ring gear/sun gear tooth ratio of the planetary gear set 40. The numerical value the second forward speed ratio is determined utilizing the ring gear/sun gear tooth ratio of the planetary gear set 40.

The third forward speed ratio is established with the engagement of the input clutch 62 and the synchronizers 65, 67. In this configuration, the input shaft 17 is directly connected to the output shaft 19. The numerical value of the third forward speed ratio is 1.

The fourth forward speed ratio is established with the engagement of the input clutch 63, the synchronizing brake 69 and the synchronizer 70. The input clutch 63 connects the ring gear member 44 to the input shaft 17. The synchronizing brake 69 connects the sun gear member 52 to the transmission housing 80. The synchronizer 70 connects the sun gear member 42 to the planet carrier assembly member 56. The sun gear member 42 rotates at the same speed as the planet carrier assembly member 56. The planet carrier assembly member 46 and the ring gear member 54 rotate at the same speed as the output shaft 19. The ring gear member 44 rotates at the same speed as the input shaft 17. The planet carrier assembly member 46, and therefore the output shaft 19, rotates at a speed determined from the speed of the ring gear member 44, the speed of the sun gear member 42 and the ring gear/sun gear tooth ratio of the planetary gear set 40. The sun gear member 52 does not rotate. The ring gear member 54 rotates at a speed determined from the speed of the planet carrier assembly member 56 and the ring gear/sun gear tooth ratio of the planetary gear set 50. The numerical value of the fourth forward speed ratio is determined utilizing the ring gear/sun gear tooth ratios of the planetary gear sets 40, 50.

The fifth forward speed ratio is established with the engagement of the input clutch 62, the synchronizing brake 64 and the synchronizer 66. The input clutch 62 connects the sun gear member 22 to the input shaft 17. The synchronizing brake 64 connects the planet carrier assembly member 26 to the transmission housing 80. The synchronizer 66 connects the sun gear member 22 to the planet carrier assembly member 36. The sun gear member 22 and the planet carrier assembly member 36 rotate at the same speed as the input shaft 17. The planet carrier assembly member 26 does not rotate. The ring gear member 24 rotates at the same speed as the sun gear member 32. The ring gear member 24 rotates at a speed determined from the speed of the sun gear member 22 and the ring gear/sun gear tooth ratio of the planetary gear set 20. The ring gear member 34 and the planet carrier assembly member 46 rotate at the same speed as the output shaft 19. The ring gear member 34, and therefore the output shaft 19, rotates at a speed determined from the speed of the planet carrier assembly member 36, the speed of the sun gear member 32 and the ring gear/sun gear tooth ratio of the planetary gear set 30. The numerical value of the fifth forward speed ratio is determined utilizing the ring gear/sun gear tooth ratios of the planetary gear sets 20, 30.

The sixth forward speed ratio is established with the engagement of the input clutch 63, the synchronizing brake 68 and the synchronizer 71. The input clutch 63 connects the ring gear member 44 to the input shaft 17. The synchronizing brake 68 connects the planet carrier assembly member 56 to the transmission housing 80. The synchronizer 71 connects the sun gear member 42 to the sun gear member 52. The sun gear member 42 rotates at the same speed as the sun gear member 52. The planet carrier assembly member 46 and the ring gear member 54 rotate at the same speed as the output shaft 19. The ring gear member 44 rotates at the same speed as the input shaft 17. The planet carrier assembly member 46, and therefore the output shaft 19, rotates at a speed determined from the speed of the ring gear member 44, the speed of the sun gear member 42 and the ring gear/sun gear tooth ratio of the planetary gear set 40. The planet carrier assembly member 56 does not rotate. The ring gear member 54 rotates at a speed determined from the speed of the sun gear member 52 and the ring gear/sun gear tooth ratio of the planetary gear set 50. The numerical value of the sixth forward speed ratio is determined utilizing the ring gear/sun gear tooth ratios of the planetary gear sets 40, 50.

As set forth above, the engagement schedule for the torque transmitting mechanisms is shown in the truth table of Figure 1b. This truth table also provides an example of speed ratios that are available utilizing the ring gear/sun gear tooth ratios given by way of example in FIG. 1b. The R1/S1 value is the tooth ratio of the planetary gear set 20; the R2/S2 value is the tooth ratio of the planetary gear set 30; the R3/S3 value is the tooth ratio of the planetary gear set 40; and the R4/S4 value is the tooth ratio of the planetary gear set 50. Also, the chart of FIG. 1b describes the ratio steps that are attained utilizing the sample of tooth ratios given. For example, the step ratio between first and second forward speed ratios is 1.93, while the step ratio between the reverse and first forward ratio is −0.56.

Figures 2A, 2B:
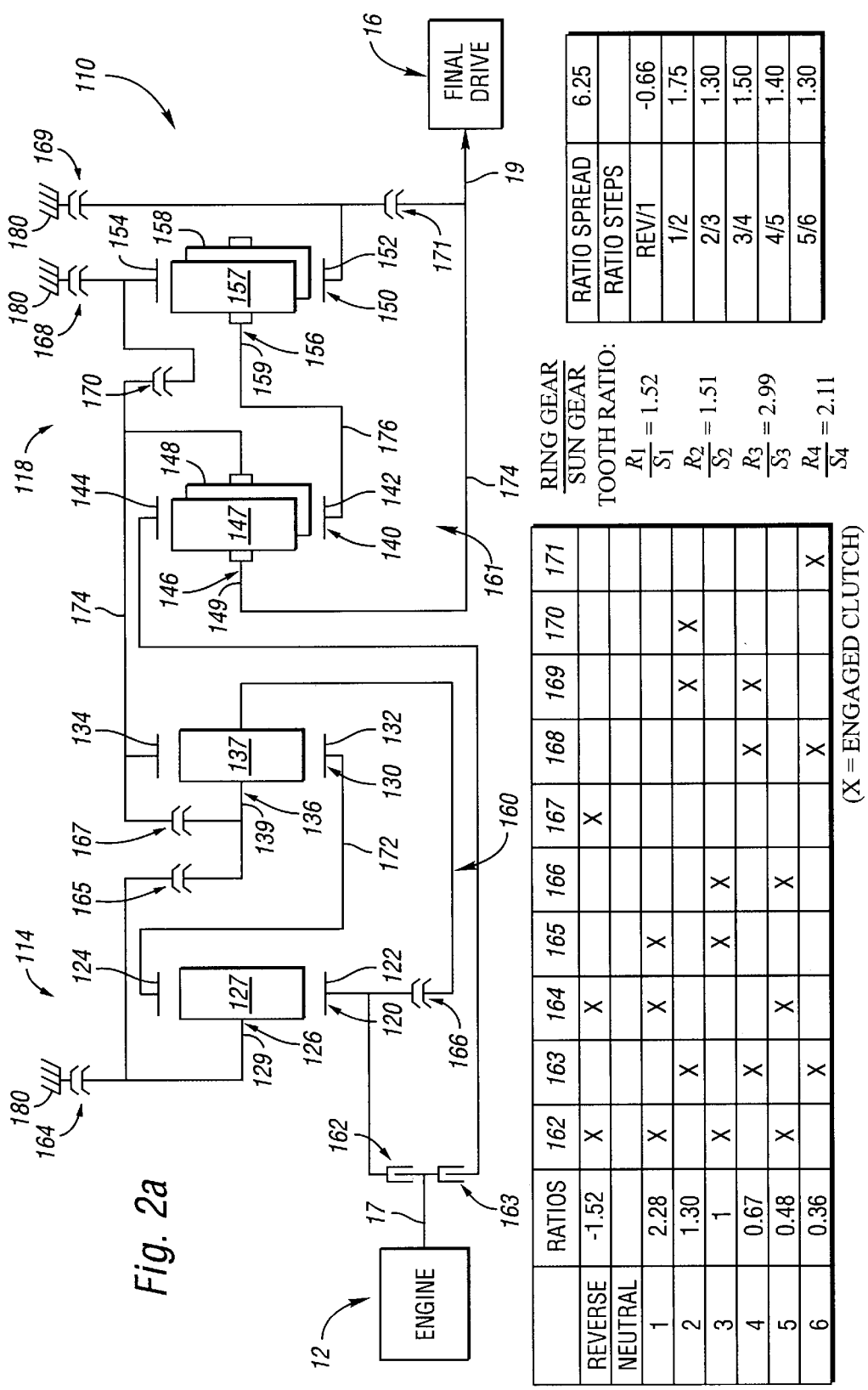

FIG. 2a shows a powertrain 110 having a conventional engine 12, a planetary transmission 114, and a conventional final drive mechanism 16. The planetary transmission 114 includes an input shaft 17 connected with the engine 12, a planetary gear arrangement 118, and an output shaft 19 connected with the final drive mechanism 16. The planetary gear arrangement 118 includes four planetary gear sets 120, 130, 140 and 150.

The planetary gear set 120 includes a sun gear member 122, a ring gear member 124, and a planet carrier assembly member 126. The planet carrier assembly member 126 includes a plurality of pinion gears 127 rotatably mounted on a carrier member 129 and disposed in meshing relationship with both the sun gear member 122 and the ring gear member 124.

The planetary gear set 130 includes a sun gear member 132, a ring gear member 134, and a planet carrier assembly member 136. The planet carrier assembly member 136 includes a plurality of pinion gears 137 rotatably mounted on a carrier member 139 and disposed in meshing relationship with both the sun gear member 132 and the ring gear member 134.

The planetary gear set 140 includes a sun gear member 142, a ring gear member 144, and a planet carrier assembly member 146. The planet carrier assembly member 146 includes a plurality of intermeshing pinion gears 147, 148 rotatably mounted on a carrier member 149 and disposed in meshing relationship with the ring gear member 144 and the sun gear member 142, respectively.

The planetary gear set 150 includes a sun gear member 152, a ring gear member 154, and a planet carrier assembly member 156. The planet carrier assembly member 156 includes a plurality of intermeshing pinion gears 157, 158 rotatably mounted on a carrier member 159 and disposed in meshing relationship with the ring gear member 154 and the sun gear member 152, respectively.

As a result of the dual clutch arrangement of the invention, the four planetary gear sets 120, 130, 140 and 150 are divided into first and second transmission subsets 160, 161 which are alternatively engaged to provide odd number and even number speed ranges, respectively. Transmission subset 160 includes planetary gear sets 120 and 130, and transmission subset 161 includes planetary gear sets 140 and 150. The output shaft 19 is continuously connected with members of both subsets 160 and 161.

As mentioned above, the first and second input clutches 162, 163 are alternatively engaged for transmitting power from the input shaft 17 to transmission subset 160 or transmission subset 161. The first and second input clutches 162, 163 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 160, 161 prior to engaging the respective input clutches 162, 163. The preselection is achieved by means of electronically controlled synchronizers. As shown, the planetary gear arrangement includes eight torque transmitting mechanisms 164, 165, 166, 167, 168, 169, 170 and 171. The torque transmitting mechanisms 164, 168 and 169 comprise braking synchronizers, and the torque transmitting mechanisms 165, 166, 167, 170 and 171 comprise rotating synchronizers.

Accordingly, the input shaft 17 is alternately connected with the first and second transmission subsets 160, 161 (i.e. through the clutch 162 to the sun gear member 122 and through the clutch 163 to the ring gear member 144). The ring gear member 124 is continuously connected with the sun gear member 132 through the interconnecting member 172. The ring gear member 134 is continuously connected with the planet carrier assembly member 146 and the output shaft 19 through the interconnecting member 174. The sun gear member 142 is continuously connected with the planet carrier assembly member 156 through the interconnecting member 176.

The sun gear member 122 is selectively connectable with the input shaft 17 through the input clutch 162. The ring gear member 144 is selectively connectable with the input shaft 17 through the input clutch 163. The planet carrier assembly member 126 is selectively connectable with the transmission housing 180 through the synchronizing brake 164. The planet carrier assembly member 126 is selectively connectable with the planet carrier assembly member 136 through the synchronizer 165. The sun gear member 122 is selectively connectable with the planet carrier assembly member 136 through the synchronizer 166. The ring gear member 134 is selectively connectable with the planet carrier assembly member 136 through the synchronizer 167. The ring gear member 154 is selectively connectable with the transmission housing 180 through the synchronizing brake 168. The sun gear member 152 is selectively connectable with the transmission housing 180 through the synchronizing brake 169. The planet carrier assembly member 146 is selectively connectable with the ring gear member 154 through the synchronizer 170. The planet carrier assembly member 146 is selectively connectable with the sun gear member 152 through the synchronizer 171.

As shown in FIG. 2b, and in particular the truth table disclosed therein, the input clutches and torque transmitting mechanisms are selectively engaged in combinations of three to provide six forward speed ratios and a reverse speed ratio.

The reverse speed ratio is established with the engagement of the input clutch 162, the synchronizing brake 164 and the synchronizer 167. The input clutch 162 connects the sun gear member 122 to the input shaft 17. The synchronizing brake 164 connects the planet carrier assembly member 126 to the transmission housing 180. The synchronizer 167 connects the ring gear member 134 to the planet carrier assembly member 136. The sun gear member 122 rotates at the same speed as the input shaft 17. The planet carrier assembly member 126 does not rotate. The ring gear member 124, the planetary gear set 130 and the planet carrier assembly member 146 rotates at the same speed as the output shaft 19. The ring gear member 124, and therefore the output shaft 19, rotates at a speed determined from the speed of the sun gear member 122 and the ring gear/sun gear tooth ratio of the planetary gear set 120. The numerical value of the reverse speed ratio is determined utilizing the ring gear/sun gear tooth ratio of the planetary gear set 120.

The first forward speed ratio is established with the engagement of the input clutch 162, the synchronizing brake 164 and the synchronizer 165. The input clutch 162 connects the sun gear member 122 to the input shaft 17. The synchronizing brake 164 connects the planet carrier assembly member 126 to the transmission housing 180. The synchronizer 165 connects the planet carrier assembly member 126 to the planet carrier assembly member 136. The sun gear member 122 rotates at the same speed as the input shaft 17. The planet carrier assembly member 126 and the planet carrier assembly member 136 do not rotate. The ring gear member 124 rotates at the same speed as the sun gear member 132. The ring gear member 124 rotates at a speed determined from the speed of the sun gear member 122 and the ring gear/sun gear tooth ratio of the planetary gear set 120. The ring gear member 134 and the planet carrier assembly member 146 rotate at the same speed as the output shaft 19. The ring gear member 134, and therefore the output shaft 19, rotates at a speed determined from the speed of the sun gear member 132 and the ring gear/sun gear tooth ratio of the planetary gear set 130. The numerical value of the first forward speed ratio is determined utilizing the ring gear/sun gear tooth ratios of the planetary gear sets 120, 130.

The second forward speed ratio is established with the engagement of the input clutch 163, the synchronizing brake 169 and the synchronizer 170. The input clutch 163 connects the ring gear member 144 to the input shaft 17. The synchronizing brake 169 connects the sun gear member 152 to the transmission housing 180. The synchronizer 170 connects the planet carrier assembly member 146 to the ring gear member 154. The sun gear member 142 rotates at the same speed as the planet carrier assembly member 156. The planet carrier assembly member 146 and the ring gear member 154 rotate at the same speed as the output shaft 19. The ring gear member 144 rotates at the same speed as the input shaft 17. The planet carrier assembly member 146, and therefore the output shaft 19, rotates at a speed determined from the speed of the ring gear member 144, the speed of the sun gear member 142 and the ring gear/sun gear tooth ratio of the planetary gear set 140. The sun gear member 152 does not rotate. The ring gear member 154 rotates at a speed determined from the speed of the planet carrier assembly member 156 and the ring gear/sun gear tooth ratio of the planetary gear set 150. The numerical value of the second forward speed ratio is determined utilizing the ring gear/sun gear tooth ratios of the planetary gear sets 140, 150.

The third forward speed ratio is established with the engagement of the input clutch 162 and the synchronizers 165, 166. In this configuration, the input shaft 17 is directly connected to the output shaft 19. The numerical value of the third forward speed ratio is 1.

The fourth forward speed ratio is established with the engagement of the input clutch 163 and the synchronizing brakes 168, 169. The input clutch 163 connects the ring gear member 144 to the input shaft 17. The synchronizing brake 168 connects the ring gear member 154 to the transmission housing 180. The synchronizing brake 169 connects the sun gear member 152 to the transmission housing 180. The sun gear member 142 and the planetary gear set 150 do not rotate. The planet carrier assembly member 146 rotates at the same speed as the output shaft 19. The ring gear member 144 rotates at the same speed as the input shaft 17. The planet carrier assembly member 146, and therefore the output shaft 19, rotates at a speed determined from the speed of the ring gear member 144 and the ring gear/sun gear tooth ratio of the planetary gear set 140. The numerical value of the fourth forward speed ratio is determined utilizing the ring gear/sun gear tooth ratio of the planetary gear set 140.

The fifth forward speed ratio is established with the engagement of the input clutch 162, the synchronizing brake 164 and the synchronizer 166. The input clutch 162 connects the sun gear member 122 to the input shaft 17. The synchronizing brake 164 connects the planet carrier assembly member 126 to the transmission housing 180. The synchronizer 166 connects the sun gear member 122 to the planet carrier assembly member 136. The sun gear member 122 and the planet carrier assembly member 136 rotate at the same speed as the input shaft 17. The planet carrier assembly member 126 does not rotate. The ring gear member 124 rotates at the same speed as the sun gear member 132. The ring gear member 124 rotates at a speed determined from the speed of the sun gear member 122 and the ring gear/sun gear tooth ratio of the planetary gear set 120. The ring gear member 134 and the planet carrier assembly member 146 rotate at the same speed as the output shaft 19. The ring gear member 134, and therefore the output shaft 19, rotates at a speed determined from the speed of the planet carrier assembly member 136, the speed of the sun gear member 132 and the ring gear/sun gear tooth ratio of the planetary gear set 130. The numerical value of the fifth forward speed ratio is determined utilizing the ring gear/sun gear tooth ratios of the planetary gear sets 120, 130.

The sixth forward speed ratio is established with the engagement of the input clutch 163, the synchronizing brake 168 and the synchronizer 171. The input clutch 163 connects the ring gear member 144 to the input shaft 17. The synchronizing brake 168 connects the ring gear member 154 to the transmission housing 180. The synchronizer 171 connects the planet carrier assembly member 146 to the sun gear member 152. The sun gear member 142 rotates at the same speed as the planet carrier assembly member 156. The planet carrier assembly member 146 and the sun gear member 152 rotate at the same speed as the output shaft 19. The ring gear member 144 rotates at the same speed as the input shaft 17. The planet carrier assembly member 146, and therefore the output shaft 19, rotates at a speed determined from the speed of the ring gear member 144, the speed of the sun gear member 142 and the ring gear/sun gear tooth ratio of the planetary gear set 140. The ring gear member 154 does not rotate. The planet carrier assembly member 156 rotates at a speed determined from the speed of the sun gear member 152 and the ring gear/sun gear tooth ratio of the planetary gear set 150. The numerical value of the sixth forward speed ratio is determined utilizing the ring gear/sun gear tooth ratios of the planetary gear sets 140, 150.

As set forth above, the truth table of FIG. 2b describes the engagement sequence of the torque transmitting mechanisms utilized to provide a reverse drive ratio and six forward speed ratios. The truth table also provides an example of the ratios that can be attained with the family members shown in FIG. 2a utilizing the sample tooth ratios given in FIG. 2b. The R1/S1 value is the tooth ratio of the planetary gear set 120; the R2/S2 value is the tooth ratio of the planetary gear set 130; the R3/S3 value is the tooth ratio of the planetary gear set 140; and the R4/S4 value is the tooth ratio of the planetary gear set 150. Also shown in FIG. 2b are the ratio steps between single step ratios in the forward direction as well as the reverse to first ratio step. For example, the first to second step ratio is 1.75.

Figures 3A, 3B:
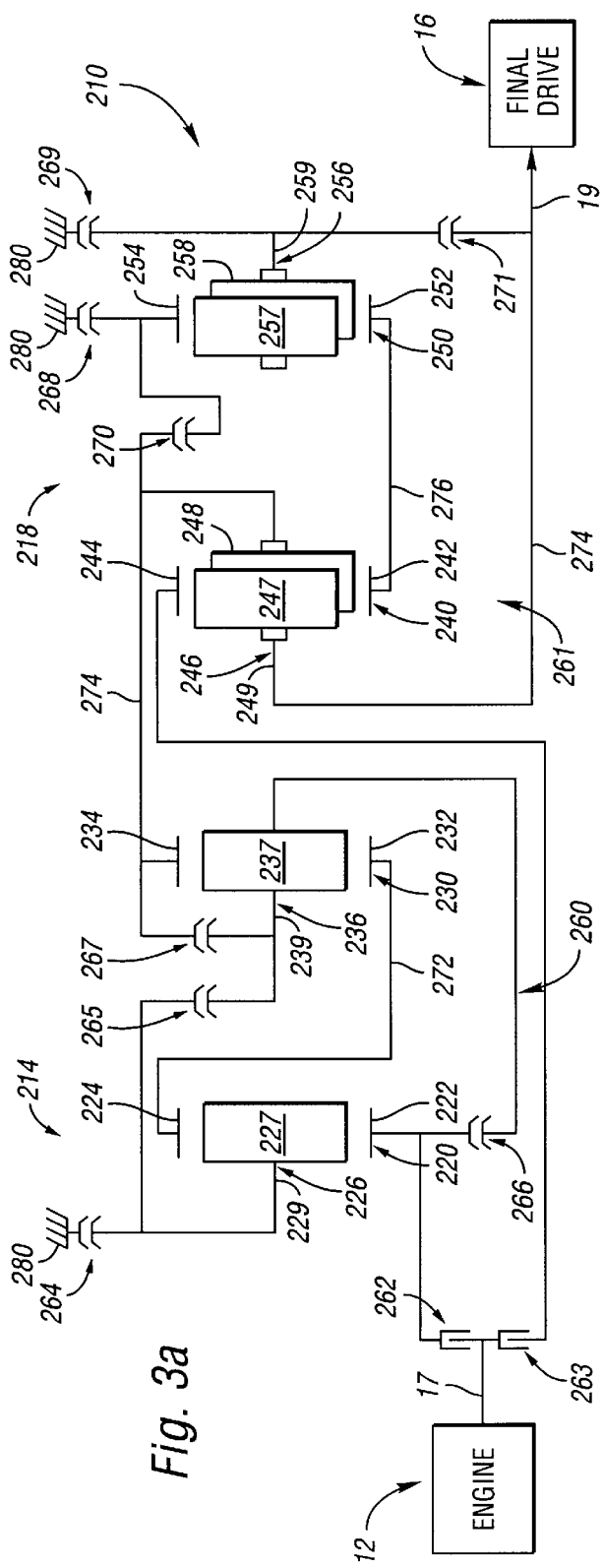

Turning the FIG. 3a, a powertrain 210 having a conventional engine 12, a planetary transmission 214, and conventional final drive mechanism 16 is shown.

The planetary transmission 214 includes an input shaft 17 continuously connected with the engine 12, a planetary gear arrangement 218, and an output shaft 19 continuously connected with the final drive mechanism 16. The planetary gear arrangement 218 includes four planetary gear sets 220, 230, 240 and 250.

The planetary gear set 220 includes a sun gear member 222, a ring gear member 224, and a planet carrier assembly member 226. The planet carrier assembly member 226 includes a plurality of pinion gears 227 rotatably mounted on a carrier member 229 and disposed in meshing relationship with both the sun gear member 222 and the ring gear member 224.

The planetary gear set 230 includes a sun gear member 232, a ring gear member 234, and a planet carrier assembly member 236. The planet carrier assembly member 236 includes a plurality of pinion gears 237 rotatably mounted on a carrier member 239 and disposed in meshing relationship with both the sun gear member 232 and the ring gear member 234.

The planetary gear set 240 includes a sun gear member 242, a ring gear member 244, and a planet carrier assembly member 246. The planet carrier assembly member 246 includes a plurality of intermeshing pinion gears 247, 248 rotatably mounted on a carrier member 249 and disposed in meshing relationship with the ring gear member 244 and the sun gear member 242, respectively.

The planetary gear set 250 includes a sun gear member 252, a ring gear member 254, and a planet carrier assembly member 256. The planet carrier assembly member 256 includes a plurality of intermeshing pinion gears 257, 258 rotatably mounted on a carrier member 259 and disposed in meshing relationship with the ring gear member 254 and the sun gear member 252, respectively.

As a result of the dual clutch arrangement of the invention, the four planetary gear sets 220, 230, 240 and 250 are divided into first and second transmission subsets 260, 261 which are alternatively engaged to provide odd number and even number speed ranges, respectively. Transmission subset 260 includes planetary gear sets 220 and 230, and transmission subset 261 includes planetary gear sets 240 and 250. The output shaft 19 is continuously connected with members of both subsets 260 and 261.

As mentioned above, the first and second input clutches 262, 263 are alternatively engaged for transmitting power from the input shaft 17 to transmission subset 260 or transmission subset 261. The first and second input clutches 262, 263 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 260, 261 prior to engaging the respective input clutches 262, 263. The preselection is achieved by means of electronically controlled synchronizers. As shown, the planetary gear arrangement includes eight torque transmitting mechanisms 264, 265, 266, 267, 268, 269, 270 and 271. The torque transmitting mechanisms 264, 268 and 269 comprise braking synchronizers, and the torque transmitting mechanisms 265, 266, 267, 270 and 271 comprise rotating synchronizers.

Accordingly, the input shaft 17 is alternately connected with the first and second transmission subsets 260, 261 (i.e. through the clutch 262 to the sun gear member 222 and through the clutch 263 to the ring gear member 244). The ring gear member 224 is continuously connected with the sun gear member 232 through the interconnecting member 272. The ring gear member 234 is continuously connected with the planet carrier assembly member 246 and the output shaft 19 through the interconnecting member 274. The sun gear member 242 is continuously connected with the sun gear member 252 through the interconnecting member 276.

The sun gear member 222 is selectively connectable with the input shaft 17 through the input clutch 262. The ring gear member 244 is selectively connectable with the input shaft 17 through the input clutch 263. The planet carrier assembly member 226 is selectively connectable with the transmission housing 280 through the synchronizing brake 264. The planet carrier assembly member 226 is selectively connectable with the planet carrier assembly member 236 through the synchronizer 265. The sun gear member 222 is selectively connectable with the planet carrier assembly member 236 through the synchronizer 266. The ring gear member 234 is selectively connectable with the planet carrier assembly member 236 through the synchronizer 267. The ring gear member 254 is selectively connectable with the transmission housing 280 through the synchronizing brake 268. The planet carrier assembly member 256 is selectively connectable with the transmission housing 280 through the synchronizing brake 269. The planet carrier assembly member 246 is selectively connectable with the ring gear member 254 through the synchronizer 270. The planet carrier assembly member 246 is selectively connectable with the planet carrier assembly member 256 through the synchronizer 271.

As shown in FIG. 3b, and in particular the truth table disclosed therein, the input clutches and torque transmitting mechanisms are selectively engaged in combinations of three to provide six forward speed ratios and a reverse speed ratio.

The reverse speed ratio is established with the engagement of the input clutch 262, the synchronizing brake 264 and the synchronizer 267. The input clutch 262 connects the sun gear member 222 to the input shaft 17. The synchronizing brake 264 connects the planet carrier assembly member 226 to the transmission housing 280. The synchronizer 267 connects the ring gear member 234 to the planet carrier assembly member 236. The sun gear member 222 rotates at the same speed as the input shaft 17. The planet carrier assembly member 226 does not rotate. The ring gear member 224, the planetary gear set 230 and the planet carrier assembly member 246 rotate at the same speed as the output shaft 19. The ring gear member 224, and therefore the output shaft 19, rotates at a speed determined from the speed of the sun gear member 222 and the ring gear/sun gear tooth ratio of the planetary gear set 220. The numerical value of the reverse speed ratio is determined utilizing the ring gear/sun gear tooth ratio of the planetary gear set 220.

The first forward speed ratio is established with the engagement of the input clutch 262, the synchronizing brake 264 and the synchronizer 265. The input clutch 262 connects the sun gear member 222 to the input shaft 17. The synchronizing brake 264 connects the planet carrier assembly member 226 to the transmission housing 280. The synchronizer 265 connects the planet carrier assembly member 226 to the planet carrier assembly member 236. The sun gear member 222 rotates at the same speed as the input shaft 17. The planet carrier assembly member 226 and the planet carrier assembly member 236 do not rotate. The ring gear member 224 rotates at the same speed as the sun gear member 232. The ring gear member 224 rotates at a speed determined from the speed of the sun gear member 222 and the ring gear/sun gear tooth ratio of the planetary gear set 220. The ring gear member 234 and the planet carrier assembly member 246 rotate at the same speed as the output shaft 19. The ring gear member 234, and therefore the output shaft 19, rotates at a speed determined from the speed of the sun gear member 232 and the ring gear/sun gear tooth ratio of the planetary gear set 230. The numerical value of the first forward speed ratio is determined utilizing the ring gear/sun gear tooth ratios of the planetary gear sets 220, 230.

The second forward speed ratio is established with the engagement of the input clutch 263, the synchronizing brake 269 and the synchronizer 270. The input clutch 263 connects the ring gear member 244 to the input shaft 17. The synchronizing brake 269 connects the planet carrier assembly member 256 to the transmission housing 280. The synchronizer 270 connects the planet carrier assembly member 246 to the ring gear member 254. The sun gear member 242 rotates at the same speed as the sun gear member 252. The planet carrier assembly member 246 and the ring gear member 254 rotate at the same speed as the output shaft 19. The ring gear member 244 rotates at the same speed as the input shaft 17. The planet carrier assembly member 246, and therefore the output shaft 19, rotates at a speed determined from the speed of the ring gear member 244, the speed of the sun gear member 242 and the ring gear/sun gear tooth ratio of the planetary gear set 240. The planet carrier assembly member 256 does not rotate. The ring gear member 254 rotates at a speed determined from the speed of the sun gear member 252 and the ring gear/sun gear tooth ratio of the planetary gear set 250. The numerical value of the second forward speed ratio is determined utilizing the ring gear/sun gear tooth ratios of the planetary gear sets 240, 250.

The third forward speed ratio is established with the engagement of the input clutch 262 and the synchronizers 265, 266. In this configuration, the input shaft 17 is directly connected to the output shaft 19. The numerical value of the third forward speed ratio is 1.

The fourth forward speed ratio is established with the engagement of the input clutch 263 and the synchronizing brakes 268, 269. The input clutch 263 connects the ring gear member 244 to the input shaft 17. The synchronizing brake 268 connects the ring gear member 254 to the transmission housing 280. The synchronizing brake 269 connects the planet carrier assembly member 256 to the transmission housing 280. The sun gear member 242 and the planetary gear set 250 do not rotate. The planet carrier assembly member 246 rotates at the same speed as the output shaft 19. The ring gear member 244 rotates at the same speed as the input shaft 17. The planet carrier assembly member 246, and therefore the output shaft 19, rotates at a speed determined from the speed of the ring gear member 244 and the ring gear/sun gear tooth ratio of the planetary gear set 240. The numerical value of the fourth forward speed ratio is determined utilizing the ring gear/sun gear tooth ratio of the planetary gear set 240.

The fifth forward speed ratio is established with the engagement of the input clutch 262, the synchronizing brake 264 and the synchronizer 266. The input clutch 262 connects the sun gear member 222 to the input shaft 17. The synchronizing brake 264 connects the planet carrier assembly member 226 to the transmission housing 280. The synchronizer 266 connects the sun gear member 222 to the planet carrier assembly member 236. The sun gear member 222 and the planet carrier assembly member 236 rotate at the same speed as the input shaft 17. The planet carrier assembly member 226 does not rotate. The ring gear member 224 rotates at the same speed as the sun gear member 232. The ring gear member 224 rotates at a speed determined from the speed of the sun gear member 222 and the ring gear/sun gear tooth ratio of the planetary gear set 220. The ring gear member 234 and the planet carrier assembly member 246 rotate at the same speed as the output shaft 19. The ring gear member 234, and therefore the output shaft 19, rotates at a speed determined from the speed of the planet carrier assembly member 236, the speed of the sun gear member 232 and the ring gear/sun gear tooth ratio of the planetary gear set 230. The numerical value of the fifth forward speed ratio is determined utilizing the ring gear/sun gear tooth ratios of the planetary gear sets 220, 230.

The sixth forward speed ratio is established with the engagement of the input clutch 263, the synchronizing brake 268 and the synchronizer 271. The input clutch 263 connects the ring gear member 244 to the input shaft 17. The synchronizing brake 268 connects the ring gear member 254 to the transmission housing 280. The synchronizer 268 connects the planet carrier assembly member 246 to the planet carrier assembly member 256. The sun gear member 242 rotates at the same speed as the sun gear member 252. The planet carrier assembly member 246 and the planet carrier assembly member 256 rotate at the same speed as the output shaft 19. The ring gear member 244 rotates at the same speed as the input shaft 17. The planet carrier assembly member 246, and therefore the output shaft 19, rotates at a speed determined from the speed of the ring gear member 244, the speed of the sun gear member 242 and the ring gear/sun gear tooth ratio of the planetary gear set 240. The ring gear member 254 does not rotate. The planet carrier assembly member 256 rotates at a speed determined from the speed of the sun gear member 252 and the ring gear/sun gear tooth ratio of the planetary gear set 250. The numerical value of the sixth forward speed ratio is determined utilizing the ring gear/sun gear tooth ratios of the planetary gear sets 240, 250.

As previously set forth, the truth table of FIG. 3b describes the combinations of engagements utilized for six forward speed ratios and one reverse speed ratio. The truth table also provides an example of speed ratios that are available with the family member described above. These examples of speed ratios are determined the tooth ratios given in FIG. 3b. The R1/S1 value is the tooth ratio of the planetary gear set 220; the R2/S2 value is the tooth ratio of the planetary gear set 230; the R3/S3 value is the tooth ratio of the planetary gear set 240; and the R4/S4 value is the tooth ratio of the planetary gear set 250. Also depicted in FIG. 3b is a chart representing the ratio steps between adjacent forward speed ratios and the reverse speed ratio. For example, the first to second ratio interchange has a step of 1.75.

A powertrain 310, shown in FIG. 4a, includes the engine 12, a planetary transmission 314, and the final drive mechanism 16. The planetary transmission 314 includes an input shaft 17 continuously connected with the engine 12, a planetary gear arrangement 318, and an output shaft 19 continuously connected with the final drive mechanism 16. The planetary gear arrangement 318 includes four planetary gear sets 320, 330, 340 and 350.

The planetary gear set 320 includes a sun gear member 322, a ring gear member 324, and a planet carrier assembly member 326. The planet carrier assembly member 326 includes a plurality of intermeshing pinion gears 327, 328 rotatably mounted on a carrier member 329 and disposed in meshing relationship with the ring gear member 324 and the sun gear member 322, respectively.

The planetary gear set 330 includes a sun gear member 332, a ring gear member 334, and a planet carrier assembly member 336. The planet carrier assembly member 336 includes a plurality of intermeshing pinion gears 337, 338 rotatably mounted on a carrier member 339 and disposed in meshing relationship with the ring gear member 334 and the sun gear member 332, respectively.

The planetary gear set 340 includes a sun gear member 342, a ring gear member 344, and a planet carrier assembly member 346. The planet carrier assembly member 346 includes a plurality of pinion gears 347 rotatably mounted on a carrier member 349 and disposed in meshing relationship with both the sun gear member 342 and the ring gear member 344.

The planetary gear set 350 includes a sun gear member 352, a ring gear member 354, and a planet carrier assembly member 356. The planet carrier assembly member 356 includes a plurality of intermeshing pinion gears 357, 358 rotatably mounted on a carrier member 359 and disposed in meshing relationship with the ring gear member 354 and the sun gear member 352, respectively.

As a result of the dual clutch arrangement of the invention, the four planetary gear sets 320, 330, 340 and 350 are divided into first and second transmission subsets 360, 361 which are alternatively engaged to provide odd number and even number speed ranges, respectively. Transmission subset 360 includes planetary gear sets 320 and 330, and transmission subset 361 includes planetary gear sets 340 and 350. The output shaft 19 is continuously connected with members of both subsets 360 and 361.

As mentioned above, the first and second input clutches 362, 363 are alternatively engaged for transmitting power from the input shaft 17 to transmission subset 360 or transmission subset 361. The first and second input clutches 362, 363 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 360, 361 prior to engaging the respective input clutches 362, 363. The preselection is achieved by means of electronically controlled synchronizers. As shown, the planetary gear arrangement includes eight torque transmitting mechanisms 364, 365, 366, 367, 368, 369, 370 and 371. The torque transmitting mechanisms 364, 368 and 369 comprise braking synchronizers, and the torque transmitting mechanisms 365, 366, 367, 370 and 371 comprise rotating synchronizers.

Accordingly, the input shaft 17 is alternately connected with the first and second transmission subsets 360, 361 (i.e. through the clutch 362 to the sun gear member 332 and through the clutch 363 to the ring gear member 344). The sun gear member 322 is continuously connected with the planet carrier assembly member 336 through the interconnecting member 372. The ring gear member 324 is continuously connected with the planet carrier assembly member 346 and the output shaft 19 through the interconnecting member 374. The planet carrier assembly member 346 is continuously connected with the ring gear member 354 through the interconnecting member 376.

The sun gear member 332 is selectively connectable with the input shaft 17 through the input clutch 362. The ring gear member 344 is selectively connectable with the input shaft 17 through the input clutch 363. The planet carrier assembly member 326 is selectively connectable with the transmission housing 380 through the synchronizing brake 364. The planet carrier assembly member 326 is selectively connectable with the ring gear member 334 through the synchronizer 365. The ring gear member 324 is selectively connectable with the ring gear member 334 through the synchronizer 366. The ring gear member 334 is selectively connectable with the sun gear member 332 through the synchronizer 367. The planet carrier assembly member 356 is selectively connectable with the transmission housing 380 through the synchronizing brake 368. The sun gear member 352 is selectively connectable with the transmission housing 380 through the synchronizing brake 369. The sun gear member 342 is selectively connectable with the planet carrier assembly member 356 through the synchronizer 370. The sun gear member 342 is selectively connectable with the sun gear member 352 through the synchronizer 371.

The truth tables given in FIGS. 4b, 5b, 6b and 7b show the engagement sequences for the torque transmitting mechanisms to provide at least five forward speed ratios and one reverse speed ratio. As shown and described above for the configurations in FIGS. 1a, 2a and 3a, those skilled in the art will understand from the respective truth tables how the speed ratios are established through the planetary gear sets identified in the written description.

The truth table shown in FIG. 4b describes the engagement combination and engagement sequence necessary to provide the reverse drive ratio and six forward speed ratios. A sample of the numerical values for the ratios is also provided in the truth table of FIG. 4b. These values are determined utilizing the ring gear/sun gear tooth ratios also given in FIG. 4b. The R1/S1 value is the tooth ratio for the planetary gear set 320; the R2/S2 value is the tooth ratio for the planetary gear set 330; the R3/S3 value is the tooth ratio for the planetary gear set 340; and the R4/S4 value is the tooth ratio for the planetary gear set 350. Also given in FIG. 4b is a chart describing the step ratios between the adjacent forward speed ratios and the reverse to first forward speed ratio. For example, the first to second forward speed ratio step is 1.43.

Those skilled in the art will recognize that the numerical values of the reverse and fifth forward speed ratios are determined utilizing the ring gear/sun gear tooth ratios of the planetary gear sets 320, 330. The numerical value of the first forward speed ratio is determined utilizing the ring gear/sun gear tooth ratio of the planetary gear set 320. The numerical value of the second forward speed ratio is determined utilizing the ring gear/sun gear tooth ratio of the planetary gear set 340. The numerical value of third forward speed ratio is 1. The numerical values of the fourth and sixth forward speed ratios are determined utilizing the ring gear/sun gear tooth ratios of the planetary gear sets 340, 350.

A powertrain 410 shown in FIG. 5a includes a conventional engine 12, a planetary transmission 414, and a conventional final drive mechanism 16. The planetary transmission 414 includes an input shaft 17 connected with the engine 12, a planetary gear arrangement 418, and an output shaft 19 continuously connected with the final drive mechanism 16. The planetary gear arrangement 418 includes four planetary gear sets 420, 430, 440 and 450.

The planetary gear set 420 includes a sun gear member 422, a ring gear member 424, and a planet carrier assembly member 426. The planet carrier assembly member 426 includes a plurality of intermeshing pinion gears 427, 428 rotatably mounted on a carrier member 429 and disposed in meshing relationship with the ring gear member 424 and the sun gear member 422, respectively.

The planetary gear set 430 includes a sun gear member 432, a ring gear member 434, and a planet carrier assembly member 436. The planet carrier assembly member 436 includes a plurality of intermeshing pinion gears 437, 438 rotatably mounted on a carrier member 439 and disposed in meshing relationship with the ring gear member 434 and the sun gear member 432, respectively.

The planetary gear set 440 includes a sun gear member 442, a ring gear member 444, and a planet carrier assembly member 446. The planet carrier assembly member 446 includes a plurality of intermeshing pinion gears 447, 448 rotatably mounted on a carrier member 449 and disposed in meshing relationship with the ring gear member 444 and the sun gear member 442, respectively.

The planetary gear set 450 includes a sun gear member 452, a ring gear member 454, and a planet carrier assembly member 456. The planet carrier assembly member 456 includes a plurality of intermeshing pinion gears 457, 458 rotatably mounted on a carrier member 459 and disposed in meshing relationship with the ring gear member 454 and the sun gear member 452, respectively.

As a result of the dual clutch arrangement of the invention, the four planetary gear sets 420, 430, 440 and 450 are divided into first and second transmission subsets 460, 461 which are alternatively engaged to provide odd number and even number speed ranges, respectively. Transmission subset 460 includes planetary gear sets 420 and 430, and transmission subset 461 includes planetary gear sets 440 and 450. The output shaft 19 is continuously connected with members of both subsets 460 and 461.

As mentioned above, the first and second input clutches 462, 463 are alternatively engaged for transmitting power from the input shaft 17 to transmission subset 460 or transmission subset 461. The first and second input clutches 462, 463 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 460, 461 prior to engaging the respective input clutches 462, 463. The preselection is achieved by means of electronically controlled synchronizers. As shown, the planetary gear arrangement includes eight torque transmitting mechanisms 464, 465, 466, 467, 468, 469, 470 and 471. The torque transmitting mechanisms 464, 468 and 469 comprise braking synchronizers, and the torque transmitting mechanisms 465, 466, 467, 470 and 471 comprise rotating synchronizers.

Accordingly, the input shaft 17 is alternately connected with the first and second transmission subsets 460, 461 (i.e. through the clutch 462 to the sun gear member 432 and through the clutch 463 to the ring gear member 444). The sun gear member 422 is continuously connected with the planet carrier assembly member 436 through the interconnecting member 472. The planet carrier assembly member 446 is continuously connected with the ring gear member 424 and the output shaft 19 through the interconnecting member 474. The sun gear member 442 is continuously connected with the sun gear member 452 through the interconnecting member 476.

The sun gear member 432 is selectively connectable with the input shaft 17 through the input clutch 462. The ring gear member 444 is selectively connectable with the input shaft 17 through the input clutch 463. The planet carrier assembly member 426 is selectively connectable with the transmission housing 480 through the synchronizing brake 464. The planet carrier assembly member 426 is selectively connectable with the ring gear member 434 through the synchronizer 465. The ring gear member 424 is selectively connectable with the ring gear member 434 through the synchronizer 466. The ring gear member 434 is selectively connectable with the sun gear member 432 through the synchronizer 467. The ring gear member 454 is selectively connectable with the transmission housing 480 through the synchronizing brake 468. The planet carrier assembly member 456 is selectively connectable with the transmission housing 480 through the synchronizing brake 469. The planet carrier assembly member 446 is selectively connectable with the ring gear member 454 through the synchronizer 470. The planet carrier assembly member 446 is selectively connectable with the planet carrier assembly member 456 through the synchronizer 471.

As shown in FIG. 5b, and in particular the truth table disclosed therein, the input clutches and torque transmitting mechanisms are selectively engaged in combinations of three to provide six forward speed ratios and a reverse speed ratio.

FIG. 5b also provides a chart of the ratio steps between adjacent forward ratios and between the reverse and first ratio. For example, the ratio step between the first and second forward ratios is 1.62. Those skilled in the art will recognize that the numerical values of the reverse and fifth forward speed ratios are determined utilizing the ring gear/sun gear tooth ratios of the planetary gear sets 420, 430. The numerical value of the first forward speed ratio is determined utilizing the ring gear/sun gear tooth ratio of the planetary gear set 420. The numerical values of the second and sixth forward speed ratios are determined utilizing the ring gear/sun gear tooth ratios of the planetary gear sets 440, 450. The numerical value of the third forward speed ratio is 1. The numerical value of the fourth forward speed ratio is determined utilizing the ring gear/sun gear tooth ratio of the planetary gear set 440.

A powertrain 510, shown in FIG. 6a, includes a conventional engine 12, a powertrain 514, and a convention final drive mechanism 16. The powertrain 514 includes an input shaft 17 connected with the engine 12, a planetary gear arrangement 518, and an output shaft 19 continuously connected with the final drive mechanism 16. The planetary gear arrangement 518 includes four planetary gear sets 520, 530, 540 and 550.

The planetary gear set 520 includes a sun gear member 522, a ring gear member 524, and a planet carrier assembly member 526. The planet carrier assembly member 526 includes a plurality of intermeshing pinion gears 527, 528 rotatably mounted on a carrier member 529 and disposed in meshing relationship with the ring gear member 524 and the sun gear member 522, respectively.

The planetary gear set 530 includes a sun gear member 532, a ring gear member 534, and a planet carrier assembly member 536. The planet carrier assembly member 536 includes a plurality of intermeshing pinion gears 537, 538 rotatably mounted on a carrier member 539 and disposed in meshing relationship with the ring gear member 534 and the sun gear member 532, respectively.

The planetary gear set 540 includes a sun gear member 542, a ring gear member 544, and a planet carrier assembly member 546. The planet carrier assembly member 546 includes a plurality of intermeshing pinion gears 547, 548 rotatably mounted on a carrier member 549 and disposed in meshing relationship with the ring gear member 544 and the sun gear member 542, respectively.

The planetary gear set 550 includes a sun gear member 552, a ring gear member 554, and a planet carrier assembly member 556. The planet carrier assembly member 556 includes a plurality of intermeshing pinion gears 557, 558 rotatably mounted on a carrier member 559 and disposed in meshing relationship with the ring gear member 554 and the sun gear member 552, respectively.

As a result of the dual clutch arrangement of the invention, the four planetary gear sets 520, 530, 540 and 550 are divided into first and second transmission subsets 560, 561 which are alternatively engaged to provide odd number and even number speed ranges, respectively. Transmission subset 560 includes planetary gear sets 520 and 530, and transmission subset 561 includes planetary gear sets 540 and 550. The output shaft 19 is continuously connected with members of both subsets 560 and 561.

As mentioned above, the first and second input clutches 562, 563 are alternatively engaged for transmitting power from the input shaft 17 to transmission subset 560 or transmission subset 561. The first and second input clutches 562, 563 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 560, 561 prior to engaging the respective input clutches 562, 563. The preselection is achieved by means of electronically controlled synchronizers. As shown, the planetary gear arrangement includes eight torque transmitting mechanisms 564, 565, 566, 567, 568, 569, 570 and 571. The torque transmitting mechanisms 564, 568 and 569 comprise braking synchronizers, and the torque transmitting mechanisms 565, 566, 567, 570 and 571 comprise rotating synchronizers.

Accordingly, the input shaft 17 is alternately connected with the first and second transmission subsets 560, 561 (i.e. through the clutch 562 to the sun gear member 532 and through the clutch 563 to the ring gear member 544). The sun gear member 522 is continuously connected with the planet carrier assembly member 536 through the interconnecting member 572. The planet carrier assembly member 546 is continuously connected with the ring gear member 524 and the output shaft 19 through the interconnecting member 574. The sun gear member 542 is continuously connected with the planet carrier assembly member 556 through the interconnecting member 576.

The sun gear member 532 is selectively connectable with the input shaft 17 through the input clutch 562. The ring gear member 544 is selectively connectable with the input shaft 17 through the input clutch 563. The planet carrier assembly member 526 is selectively connectable with the transmission housing 580 through the synchronizing brake 564. The planet carrier assembly member 526 is selectively connectable with the ring gear member 534 through the synchronizer 565. The ring gear member 524 is selectively connectable with the ring gear member 534 through the synchronizer 566. The ring gear member 534 is selectively connectable with the sun gear member 532 through the synchronizer 567. The ring gear member 554 is selectively connectable with the transmission housing 580 through the synchronizing brake 568. The sun gear member 552 is selectively connectable with the transmission housing 580 through the synchronizing brake 569. The planet carrier assembly member 546 is selectively connectable with the ring gear member 554 through the synchronizer 570. The planet carrier assembly member 546 is selectively connectable with the sun gear member 552 through the synchronizer 571.

As shown in FIG. 6b, and in particular the truth table disclosed therein, the input clutches and torque transmitting mechanisms are selectively engaged in combinations of three to provide six forward speed ratios and a reverse speed ratio. The chart of FIG. 6b describes the ratio steps between adjacent forward speed ratios and the ratio step between the reverse and first forward speed ratio.

Those skilled in the art, upon reviewing the truth table and the schematic representation of FIG. 6a can determine that the numerical values of the reverse and fifth forward speed ratios are determined utilizing the ring gear/sun gear tooth ratios of the planetary gear sets 520, 530. The numerical value of the first forward speed ratio is determined utilizing the ring gear/sun gear tooth ratio of the planetary gear set 520. The numerical values of the second and sixth forward speed ratios are determined utilizing the ring gear/sun gear tooth ratios of the planetary gear sets 540, 550. The numerical value of the third forward speed ratio is 1. The numerical value of the fourth forward speed ratio is determined utilizing the ring gear/sun gear tooth ratio of the planetary gear set 540.

The sample speed ratios given in the truth table are determined utilizing the tooth ratio values also given in FIG. 6b. R1/S1 value is the tooth ratio of the planetary gear set 520; the R2/S2 value is the tooth ratio of the planetary gear set 530; the R3/S3 value is the tooth ratio of the planetary gear set 540; and the R4/S4 value is the tooth ratio of the planetary gear set 550.

Figures 7A, 7B:
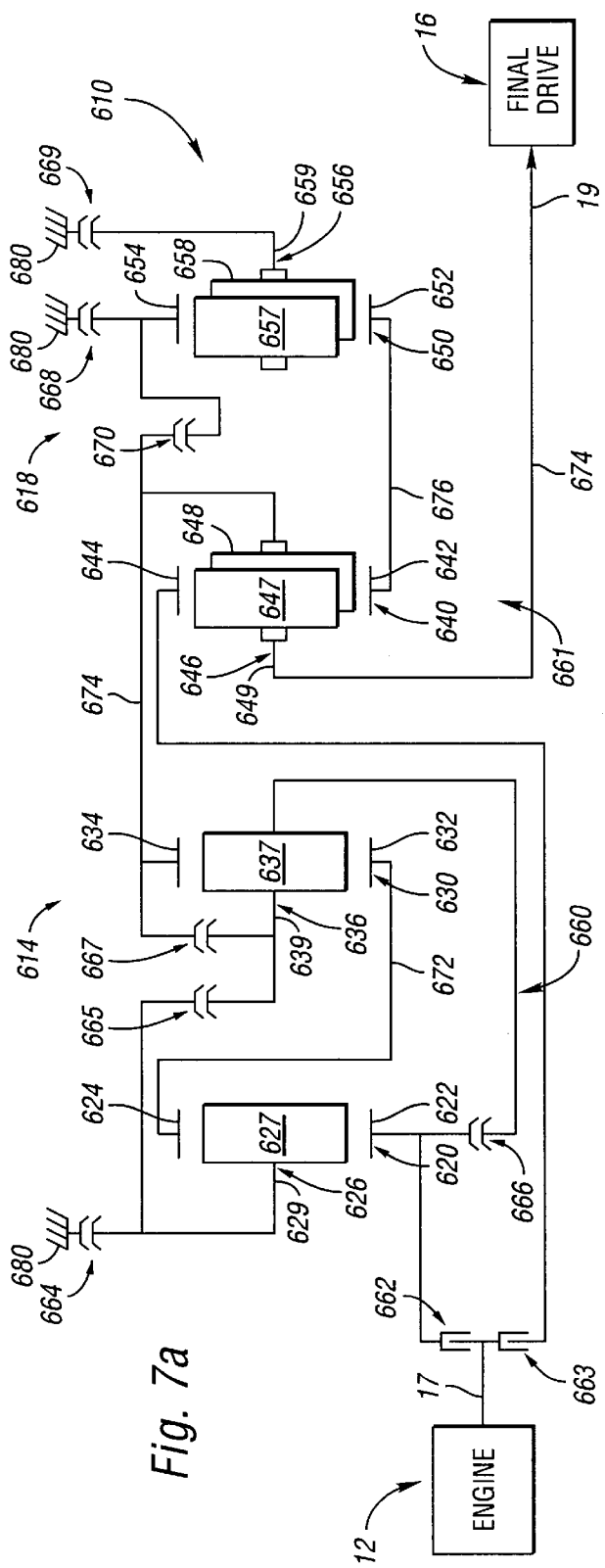

FIGS. 7a and 7b illustrate a transmission wherein one of the torque transmitting mechanisms from a previously described configuration is eliminated to realize five forward speed ratios and a reverse speed ratio. Specifically, the powertrain 610, shown in FIG. 7a is identical to that shown in FIG. 3a, except that the synchronizer 271 of FIG. 3a has been eliminated.

The powertrain 610, shown in FIG. 7a, includes the conventional engine 12, a planetary transmission 614, and the conventional final drive mechanism 16. The engine 12 is selectively connectable with the planetary transmission 614 through the input shaft 17. The planetary transmission is drivingly connected with the final drive mechanism 16 through the input shaft 17. The planetary transmission 614 includes a planetary gear arrangement 1018 that has a first planetary gear set 620, a second planetary gear set 630, a third planetary gear set 640, and a fourth planetary gear set 650.

The planetary gear set 620 includes a sun gear member 622, a ring gear member 624, and a planet carrier assembly member 626. The planet carrier assembly member 626 includes a plurality of pinion gears 627 rotatably mounted on a carrier member 629 and disposed in meshing relationship with both the sun gear member 622 and the ring gear member 624.

The planetary gear set 630 includes a sun gear member 632, a ring gear member 634, and a planet carrier assembly member 636. The planet carrier assembly member 636 includes a plurality of pinion gears 637 rotatably mounted on a carrier member 639 and disposed in meshing relationship with both the sun gear member 632 and the ring gear member 634.

The planetary gear set 640 includes a sun gear member 642, a ring gear member 644, and a planet carrier assembly member 646. The planet carrier assembly member 646 includes a plurality of intermeshing pinion gears 647, 648 rotatably mounted on a carrier member 649 and disposed in meshing relationship with the ring gear member 644 and the sun gear member 642, respectively.

The planetary gear set 650 includes a sun gear member 652, a ring gear member 654, and a planet carrier assembly member 656. The planet carrier assembly member 656 includes a plurality of intermeshing pinion gears 657, 658 rotatably mounted on a carrier member 659 and disposed in meshing relationship with the ring gear member 654 and the sun gear member 652, respectively.

As a result of the dual clutch arrangement of the invention, the four planetary gear sets 620, 630, 640 and 650 are divided into first and second transmission subsets 660, 661 which are alternatively engaged to provide odd number and even number speed ranges, respectively. Transmission subset 660 includes planetary gear sets 620 and 630, and transmission subset 661 includes planetary gear sets 640 and 650. The output shaft 19 is continuously connected with members of both subsets 660 and 661.

As mentioned above, the first and second input clutches 662, 663 are alternatively engaged for transmitting power from the input shaft 17 to transmission subset 660 or transmission subset 661. The first and second input clutches 662, 663 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 660, 661 prior to engaging the respective input clutches 662, 663. The preselection is achieved by means of electronically controlled synchronizers. As shown, the planetary gear arrangement includes seven torque transmitting mechanisms 664, 665, 666, 667, 668, 669 and 670. The torque transmitting mechanism 664, 668 and 669 comprise braking synchronizers, and the torque transmitting mechanisms 665, 666, 667 and 670 comprise rotating synchronizers.

Accordingly, the input shaft 17 is alternately connected with the first and second transmission subsets 660, 661 (i.e. through the clutch 662 to the sun gear member 622 and through the clutch 663 to the ring gear member 644). The ring gear member 624 is continuously connected with the sun gear member 632 through the interconnecting member 672. The planet carrier assembly member 646 is continuously connected with the ring gear member 634 and the output shaft 19 through the interconnecting member 674. The sun gear member 642 is continuously connected with the sun gear member 652 through the interconnecting member 676.

The sun gear member 622 is selectively connectable with the input shaft 17 through the input clutch 662. The ring gear member 644 is selectively connectable with the input shaft 17 through the input clutch 663. The planet carrier assembly member 626 is selectively connectable with the transmission housing 680 through the synchronizing brake 664. The planet carrier assembly member 626 is selectively connectable with the planet carrier assembly member 636 through the synchronizer 665. The sun gear member 622 is selectively connectable with the planet carrier assembly member 636 through the synchronizer 666. The ring gear member 634 is selectively connectable with the planet carrier assembly member 636 through the synchronizer 667. The ring gear member 654 is selectively connectable with the transmission housing 680 through the synchronizing brake 668. The planet carrier assembly member 656 is selectively connectable with the transmission housing 680 through the synchronizing brake 669. The planet carrier assembly member 646 is selectively connectable with the ring gear member 654 through the synchronizer 670.

As shown in FIG. 7b, and in particular the truth table disclosed therein, the input clutches and torque transmitting mechanisms are selectively engaged in combinations of three to provide five forward speed ratios and a reverse speed ratio. A sample of the numerical values for the ratios is also provided in the truth table of the FIG. 7b. These values are determined utilizing the ring gear/sun gear tooth ratios also given in FIG. 7b. The R1/S1 value is the tooth ratio of the planetary gear set 620; the R2/S2 value is the tooth ratio of the planetary gear set 630; the R3/S3 value is the tooth ratio of the planetary gear set 640; and the R4/S4 value is the tooth ratio of the planetary gear set 650. Also given in FIG. 7b is a chart describing the step ratios between the adjacent forward speed ratios and the reverse to first forward speed ratio.

Those skilled in the art will recognize that the numerical value of the reverse speed ratio is determined utilizing the ring gear/sun gear tooth ratio of the planetary gear set 620. The numerical values of the first and fifth forward speed ratios are determined utilizing the ring gear/sun gear tooth ratios of the planetary gear sets 620, 630. The numerical value of the second forward speed ratio is determined utilizing the ring gear/sun gear tooth ratios of the planetary gear sets 640, 650. The numerical value of the third forward speed ratio is 1. The numerical value of the fourth forward speed ratio is determined utilizing the ring gear/sun gear tooth ratio of the planetary gear set 640.

While the best modes for carrying out the invention have been described in detail, those familiar with the art to which this invention relates will recognize various alternative designs and embodiments for practicing the invention within the scope of the appended claims.

What is claimed is:

1. A multi-speed transmission comprising:
   an input shaft;
   an output shaft;
   first, second, third and fourth planetary gear sets each having first, second and third members;
   a first interconnecting member continuously interconnecting said first member of said first planetary gear set with said first member of said second planetary gear set;
   a second interconnecting member continuously interconnecting another member of said first or second planetary gear set with said first member of said third planetary gear set and with said output shaft;
   a third interconnecting member continuously interconnecting a member of said third planetary gear set with a member of said fourth planetary gear set;
   a first input clutch selectively interconnecting said input shaft with a member of said first or said second planetary gear set that is not continuously interconnected with said output shaft;
   a second input clutch selectively interconnecting said input shaft with a second member of said third planetary gear set;
   a first, second and third torque-transmitting mechanism selectively interconnecting members of said first or second planetary gear sets with other members of said first or second planetary gear set or with said first input clutch;
   a fourth and fifth torque-transmitting mechanism selectively interconnecting members of said third planetary gear set with members of said fourth planetary gear set;
   a sixth torque-transmitting mechanism selectively interconnecting a member of said first or second planetary gear set with a stationary member;
   a seventh and eighth torque-transmitting mechanism selectively interconnecting members of said fourth planetary gear set with said stationary member; and
   said input clutches and torque-transmitting mechanisms being engaged in combinations of at least three to provide at least six forward speed ratios and a reverse speed ratio.

2. The transmission defined in claim 1, wherein said eight torque-transmitting mechanisms comprise synchronizers.

3. The transmission defined in claim 1, wherein said first, second, third, fourth and fifth torque-transmitting mechanisms comprise rotating synchronizers, and said sixth, seventh and eighth torque-transmitting mechanisms comprise braking synchronizers.

4. The transmission defined in claim 1, wherein said first input clutch is applied for odd number speed ranges and said second input clutch is applied for even number speed ranges.

5. The transmission defined in claim 1, wherein said first input clutch is applied for even number speed ranges and said second input clutch is applied for odd number speed ranges.

6. The transmission defined in claim 1, wherein said first input clutch and said second input clutch are interchangeable to shift from odd number speed ranges to even number speed ranges, and vice versa.

7. The transmission defined in claim 1, wherein selected ones of said eight torque-transmitting mechanisms are engaged prior to gear shifting to achieve shifting without torque interruptions.

8. The transmission defined in claim 2, wherein at least two of said synchronizers comprise a double synchronizer to reduce cost and package size.

9. A multi-speed transmission comprising:
   an input shaft;
   an output shaft;
   first, second, third and, fourth planetary gear sets each having first, second and third members;
   a first interconnecting member continuously interconnecting said first member of said first planetary gear set with said first member of said second planetary gear set;
   a second interconnecting member continuously interconnecting another member of said first or second planetary gear set with said first member of said third planetary gear set and with said output shaft;
   a third interconnecting member continuously interconnecting a member of said third planetary gear set with a member of said fourth planetary gear set;
   a first input clutch selectively interconnecting said input shaft with a member of said first or second planetary gear set that is not continuously interconnected with said output shaft;
   a second input clutch selectively interconnecting said input shaft with a second member of said third planetary gear set; and
   eight torque-transmitting mechanisms for selectively interconnecting said members of said first, second, third or fourth planetary gear sets with said first or second input clutch, said output shaft, said first, second or third interconnecting member, a stationary member or with other members of said planetary gear sets, said eight torque-transmitting mechanisms being engaged in combinations of at least three to establish at least six forward speed ratios and a reverse speed ratio between said input shaft and said output shaft.

10. The transmission defined in claim 9, wherein first, second and third of said eight torque-transmitting mechanisms are selectively operable for interconnecting members of said first or second planetary gear sets with other members of said first or second planetary gear sets, or with said first input clutch.

11. The transmission defined in claim 9, wherein fourth and fifth of said eight torque-transmitting mechanisms are selectively operable for interconnecting members of said third planetary gear set with members of said fourth planetary gear set.

12. The transmission defined in claim 9, wherein the sixth of said eight torque-transmitting mechanisms is operable for selectively interconnecting a member of said first or second planetary gear set with said stationary member.

13. The transmission defined in claim 9, wherein seventh and eighth of said eight torque-transmitting mechanisms are operable for selectively interconnecting members of said fourth planetary gear set with said stationary member.

14. The transmission defined in claim 9, wherein planet carrier assembly members of a plurality of said planetary gear sets are of the single pinion type.

15. The transmission defined in claim 9, wherein planet carrier assembly members of a plurality of said planetary gear sets are of the double pinion type.

16. The transmission defined in claim 9, wherein each of said eight torque-transmitting mechanisms comprises a synchronizer.

17. The transmission defined in claim 9, wherein said first input clutch is applied for odd number speed ranges and said second input clutch is applied for even number speed ranges.

18. The transmission defined in claim 9, wherein said first input clutch is applied for even number speed ranges and said second input clutch is applied for odd number speed ranges.

19. The transmission defined in claim 9, wherein selected ones of said eight torque-transmitting mechanisms are engaged prior to gear shifting to achieve shifting without torque interruptions.

20. A multi-speed transmission comprising:
an input shaft;
an output shaft;
first, second, third and fourth planetary gear sets each having first, second and third members;
a first interconnecting member continuously interconnecting said first member of said first planetary gear set with said first member of said second planetary gear set;
a second interconnecting member continuously interconnecting another member of said first or second planetary gear set with said first member of said third planetary gear set and with said output shaft;
a third interconnecting member continuously interconnecting a member of said third planetary gear set with a member of said fourth planetary gear set;
a first input clutch selectively interconnecting said input shaft with a member of said first or second planetary gear set that is not continuously interconnected with said output shaft;
a second input clutch selectively interconnecting said input shaft with a second member of said third planetary gear set; and
seven torque-transmitting mechanisms for selectively interconnecting said members of said first, second, third or fourth planetary gear sets with said first or second input clutch, said output shaft, said first, second or third interconnecting member, a stationary member or with other members of said planetary gear sets, said seven torque-transmitting mechanisms being engaged in combinations of at least three to establish at least five forward speed ratios and a reverse speed ratio between said input shaft and said output shaft.

21. The transmission defined in claim 20, wherein first, second and third of said seven torque-transmitting mechanisms are selectively operable for interconnecting members of said first or second planetary gear sets with other members of said first or second planetary gear sets, or with said first input clutch.

22. The transmission defined in claim 20, wherein a fourth of said seven torque-transmitting mechanisms is selectively operable for interconnecting a member of said third planetary gear set with a member of said fourth planetary gear set.

23. The transmission defined in claim 20, wherein a fifth of said seven torque-transmitting mechanisms is operable for selectively interconnecting a member of said first or second planetary gear set with said stationary member.

24. The transmission defined in claim 20, wherein a sixth and seventh of said seven-torque transmitting mechanisms are operable for selectively interconnecting members of said fourth planetary gear set with said stationary member.

25. The transmission defined in claim 20, wherein planet carrier assembly members of a plurality of said planetary gear sets are of the single pinion type.

26. The transmission defined in claim 20, wherein planet carrier assembly members of a plurality of said planetary gear sets are of the double pinion type.

27. The transmission defined in claim 20, wherein each of said seven torque-transmitting mechanisms comprises a synchronizer.

28. The transmission defined in claim 20, wherein said first input clutch is applied for odd number speed ranges and said second input clutch is applied for even number speed ranges.

29. The transmission defined in claim 20, wherein said first input clutch is applied for even number speed ranges and said second input clutch is applied for odd number speed ranges.

30. The transmission defined in claim 20, wherein selected ones of said seven torque-transmitting mechanisms are engaged prior to gear shifting to achieve shifting without torque interruptions.

* * * * *